United States Patent
Macrae

(10) Patent No.: US 8,989,289 B2
(45) Date of Patent: *Mar. 24, 2015

(54) COMMUNICATING DISTINCT DATA OVER A SINGLE FREQUENCY USING MULTIPLE LINEAR POLARIZED SIGNALS

(71) Applicant: Nigel Iain Stuart Macrae, Las Vegas, NV (US)

(72) Inventor: Nigel Iain Stuart Macrae, Las Vegas, NV (US)

(*) Notice: Subject to any disclaimer, the term of this patent is extended or adjusted under 35 U.S.C. 154(b) by 0 days.

This patent is subject to a terminal disclaimer.

(21) Appl. No.: 14/064,192

(22) Filed: Oct. 28, 2013

(65) Prior Publication Data

US 2014/0050231 A1    Feb. 20, 2014

Related U.S. Application Data

(63) Continuation of application No. 13/477,084, filed on May 22, 2012.

(51) Int. Cl.
| | |
|---|---|
| *H04K 1/10* | (2006.01) |
| *H04J 1/04* | (2006.01) |
| *H01Q 1/24* | (2006.01) |
| *H01Q 21/14* | (2006.01) |
| *H04B 7/10* | (2006.01) |
| *H04L 27/28* | (2006.01) |
| *H01Q 9/28* | (2006.01) |
| *H04B 10/532* | (2013.01) |

(52) U.S. Cl.
CPC .. *H04J 1/04* (2013.01); *H01Q 1/24* (2013.01); *H01Q 21/14* (2013.01); *H04L 27/28* (2013.01); *H01Q 9/285* (2013.01); *H04B 10/532* (2013.01); *H04B 7/10* (2013.01)
USPC ........... 375/260; 375/267; 375/316; 375/299; 375/147; 342/188; 342/363; 342/365; 343/882; 343/724; 343/765; 343/777; 343/793; 455/102; 455/103; 455/101; 455/500; 370/480

(58) Field of Classification Search
CPC ......... H01Q 1/24; H01Q 21/24; H01Q 9/285; H04B 10/532; H04J 1/04; H04L 27/28
USPC ................. 375/267, 260, 316, 299, 147, 146; 342/188, 363, 365; 343/724, 765, 777, 343/793, 882; 455/102, 103, 101, 500, 455/562.1, 575.1, 105; 370/480
See application file for complete search history.

(56) References Cited

U.S. PATENT DOCUMENTS

| | | | | |
|---|---|---|---|---|
| 8,605,807 B1 * | 12/2013 | Macrae | ..................... | 375/260 |
| 2006/0128336 A1 * | 6/2006 | Waltman et al. | ............... | 455/273 |

* cited by examiner

*Primary Examiner* — Rahel Guarino

(57) ABSTRACT

A method and system for transmitting three distinct electromagnetic signals on a same frequency are provided. One or more transmitting devices transmit a first data signal and an inverse of the first data signal in two orthogonal linear polarities of an antenna maintaining their inverted phase relationship and a same amplitude as propagated. Transmitting devices also transmit a second data signal in a linear polarity with a 45 degree rotation around the transmit axis of the first data signal. Transmitting devices also transmit a third data signal in linear polarity orthogonal to the second data signal and consequently 315 degree rotation around the transmit axis from the first data signal.

20 Claims, 9 Drawing Sheets

COMMUNICATING DISTINCT DATA OVER A SINGLE FREQUENCY USING MULTIPLE LINEAR POLARIZED SIGNALS

CROSS-REFERENCE TO RELATED APPLICATION(S)

This application is a continuation application of U.S. patent application Ser. No. 13/477,084, titled "Communicating Distinct Data over A Single Frequency Using Multiple Linear Polarized Signals", filed May 22, 2012 in the United States Patent and Trademark Office. The specification of the above reference patent application is incorporated herein by reference in its entirety.

BACKGROUND

The method and system disclosed herein, in general, relates to information communication. More specifically, the method and system disclosed herein relates to communicating multiple channels of distinct data, simultaneously, over the same frequency using multiple linear polarized signals.

Current satellites and ground based radios typically reuse frequencies by transmitting signals in two orthogonal polarities of one of two polarization schemes, namely, left and right hand circular polarization, or vertical and horizontal linear polarization. Normally, no more than two signals can be transmitted along the same or proximate path, each occupying one of two orthogonal polarizations in only one of the two polarization schemes. U.S. Pat. No. 7,590,191 B1, and U.S. Pat. No. 7,957,425 as well as U.S. application Ser. No. 13/237,846 commonly assigned to the applicant have described methods to increase capacity of transmitted electromagnetic signals by using a combination of circularly and linearly polarized signals. There is a need for a method for increasing data carrying capacity using only linearly polarized signals.

In linear polarization, the electric component or the magnetic component of an electromagnetic wave is confined to within a single plane along the direction of propagation of the electromagnetic wave. Linearly polarized signals are either horizontally polarized or vertically polarized, each being orthogonal to the other, that is, rotated 90 degrees around the transmit axis. They do not interfere with each other once transmitted and using polarized receive antennae are received separately without interference from the other.

Polarization of an electromagnetic signal can be established by various methods, for example, through the shape of the radiation elements in the antenna in the case of a lower frequency antenna, or by a dipole feeding into a horn and reflector of a parabolic antenna in a higher frequency band, or by specialized emitters or by filters in the case of light.

A basic principle of electromagnetic waves is the principle of linear superposition: "when two or more waves are present simultaneously at the same place the resultant wave is the sum of the individual waves." Physics 3rd Edition by Cutnell/Johnson, Wiley and Sons, 1995. ISBN 0-471-59773-2, page 521. "Inverse signals" are two same signals that are exactly 180 degrees out of phase so that when two inverse signals of the same amplitude are combined, they sum to zero power, canceling each other.

As used herein, the term "feed horn" or "feed" refers to an apparatus that includes both a horn and a transducer, also called a polarizer. The transducer may contain a radiator or dipole that emits polarized signals for transmission. A typical transducer is a mechanical device that is attached to the horn. The horn illuminates the antenna, as well as picks up already polarized data signals for reception and passes the received signals on to the transducer. A transducer also routes the data signals from a transmission side of input flanges to the horn or from the horn to a reception side of output flanges.

As used herein, "data signal" refers to an electromagnetic signal modulated to carry information of any kind. "Information signal" and "data signal" both refer to an electromagnetic signal that contains encoded information to be communicated.

A frequency band is a contiguous set of frequencies with a center frequency and multiple side frequencies. Two signals of the "same frequency" means that at least one of the frequencies of the frequency band used to transmit a data signal is the same for both signals, i.e., at least part of the band of frequencies overlaps. Both data signals can occupy the same band or partially overlapping bands. The data signals can convey digital or analog information. The "transmit axis" is the line between a transmitting antenna and a corresponding receive antenna.

Electromagnetic waves do not interact when transmitted through a non absorbing media such as space. Horizontal and vertical linearly polarized data signals do not modify each other once transmitted and pass through space without interference. Until now, due to the noise and interference involved, only two data signals in a single polarization scheme could typically be used to communicate distinct data signals on the same frequency. This means on a given frequency, a maximum of two data signals can be transmitted simultaneously, one on each polarity of the chosen polarization scheme. There is a need for transmitting additional data signals using only linear polarization schemes resulting in increased data carrying capacity. There is a need for a method to transmit up to, for example, three data signals on a same frequency simultaneously by using linear polarized signals.

Hence, there is a long felt but unresolved need for communicating additional distinct data over a single frequency using multiple linearly polarized data signals.

SUMMARY OF THE INVENTION

This summary is provided to introduce a selection of concepts in a simplified form that are further disclosed in the detailed description of the invention. This summary is not intended to limit the scope of the claimed subject matter.

The method and system disclosed herein addresses the above stated need for simultaneously communicating three distinct data signals over a same frequency instead of two, and for doubling capacity in mobile systems. The method and system disclosed herein addresses the above stated need for communicating additional distinct data over a single frequency using multiple linearly polarized electromagnetic emissions resulting in an increase in capacity. The method and system disclosed herein can be used in any media where electromagnetic signals can be polarized. A data source provides multiple data signals conveying first data, second data and third data, wherein the data signals are of the same frequency. Each data signal is a stream of information, analog or digital, encoded by any of the known means onto a transmit carrier of selected transmit frequency. The data signals comprise a first data signal conveying first data, a second data signal conveying second data, and a third data signal conveying third data. One or more transmitting devices transmit the first data signal and an inverted copy of the first data signal in two orthogonal linear polarities of a linear polarization scheme. A transmitting device also transmits the second data signal in a linear polarity with a 45 degree rotation around a transmit axis from either the first data signal or from the inverse of the first data signal. The second data signal is transmitted from either a same location as the first data signal or a different location from the first data signal.

One or more receiving stations receive the transmitted first data signal, the inverse of the first data signal, and the second data signal.

In an embodiment, the transmitting devices transmit a third data signal (S3) in linear polarity, wherein the third data signal is transmitted orthogonal to the second data signal. The third data signal is transmitted with a 315 degree or equivalently a ±45 degree rotation around the transmit axis from either the first data signal or the inverse first data signal and, consequently, orthogonal to the second data signal.

In this embodiment, the first data signal (S1) and an inverted copy of the first data signal ($S1^{-1}$), which is 180 degrees out of phase, are polarized in orthogonal linear polarities, for example, horizontal and vertical polarities, and are transmitted in orthogonal polarizations from the same location. These signals are transmitted from the same location to maintain the inverted phase relationship as the signal propagates through the medium. Before transmission, the phase and amplitude of the first data signal and the inverse of the first data signal are adjusted as necessary for enabling the first data signal and the inverse of the first data signal to cancel each other out when received together resulting in combination. Complete cancellation of two electromagnetic signals occurs when two identical signals that are 180 degrees out of phase and of equal amplitude are combined or received together. The resulting transmission of S1 and $S1^{-1}$ has nulls at 45 degree, 135 degrees, 225 degrees and 315 degrees when looking around the transmit axis. The nulls of the two transmitted inverse signals occur at ±45 degrees from the vertical and identically ±45 degrees from the horizontal.

The second data signal S2 is transmitted in the null of the first data signal at 45 degrees. The third data signal S3 is transmitted in the null of the first data signal at −45 degrees, and orthogonal to the second data signal S2. A receive feed aligned to the transmit polarity of the second data signal receives zero interference from the two inverse first data signals since the second data signal is transmitted in a null of the inverse signals S1 and $S1^{-1}$. The second data signal is orthogonal to the third data signal which results in zero interference from the third data signal. Consequently, a correctly aligned receive antenna receives the second data signal S2 with zero interference from the first data signals S1 and $S1^{-1}$ or the third data signal S3. The second data signal is received at the receiving stations in both the orthogonal linear polarities. The received second data signal in one of the orthogonal linear polarities is combined, in phase, with the received second data signal in the other of the orthogonal linear polarities to reduce interference from the first data signal and the inverse of the first data signal.

A receive feed aligned to the transmit polarity of the third data signal receives zero interference from the two inverse first data signals since the third data signal is transmitted in a null of the two inverse first data signals. The third data signal is orthogonal to the second data signal which results in zero interference from the second data signal. Consequently, a correctly aligned receive antenna receives the third data signal S3 with zero interference from the first data signals S1 and $S1^{-1}$ or the second data signal S2.

To receive the first data signal, an antenna with both vertical and horizontal receive polarities is used. The antenna feed polarities need to be aligned with the S1 transmit polarities to pick up the selected two inverse signals, S1 and $S1^{-1}$, in the two receive linear ports, vertical and horizontal. One of the sets of data signals received in either the horizontal polarity or the vertical polarity is inverted, and then one of the two sets of received signals is phase adjusted if necessary such that the linear S1 signals match in phase. Then the received and inverted signal is summed with the signal received in the other polarity. When one signal is inverted and summed with the other, the linearly polarized data S1 signals match each other, thereby increasing the signal strength of the first data signal. One of the two S1 signals was inverted prior to transmission and then again upon reception, resulting in no net phase shift. Since both the interfering second and third polarized data signals are received at equal levels in both horizontal and vertical linear ports, and one of the two received signals in one polarity is inverted and then summed with the same signal in the other polarity, the interfering second and third data signals negate at summation, resulting in negligible interference to the first data signal S1.

The data signals S2 and S3 can be transmitted from the same location as S1 and $S1^{-1}$, or from a different location. The data signals S2 and S3 can be transmitted together from the same location or from different locations. The rotation around the transmit axis is essential.

In an alternative embodiment, both S2 (vertical) and S3 (horizontal) data signals are the same signal transmitted in phase. The two inverse orthogonal signals carry a first data signal as usual. However, instead of carrying distinct second and third data signals, both the second and third signals, horizontal and vertical, carry the same second data signal. In this embodiment, when both horizontal and vertical polarizations are received and summed in phase for detecting S2, the rotation around the transmit axis of the receive antenna in relationship to the rotation around the transmit axis of the transmit antenna does not matter allowing for use in mobile applications or applications where the rotation of the transmit polarity is unknown or varies in relationship to the receive polarity. Upon summation of the received horizontal and vertical polarities, any interference from the data signals S1 and $S1^{-1}$ cancel out and only the second data signal S2 remains. The antenna design and signal processing disclosed herein makes the rotation of the transmit antenna for the two inverse first data signals in relation to the receive antenna uncritical for reception.

Upon summing by combining the two receive polarities, horizontal (H) and vertical (V), of the receive antenna, the interfering inverse S1 signals sum to zero and the desired second data signal S2, transmitted in horizontal and vertical polarities, sums to one (full power) for all rotations of the receive antenna around the transmit axis. This means that if the receive antenna can receive both polarities H and V at equal levels, the rotation around the transmit axis does not matter. If there is another rotation along the Z axis, for example, away or toward the transmitter, in some circumstances, it is possible to adjust the received levels of each pole prior to summation such that the amplitudes of the interfering received S1 signals match and cancel.

In order to detect the first data signal S1 without interference from the second data signal S2, two orthogonal receive poles receiving signals at equal strength are used, or the strength of the two poles is electronically adjusted such that the amplitudes of the two polarities are equal. In order to detect the S1 data signal, the received signal from one linear receive element is inverted and summed with the receive signal in the orthogonal polarity. This eliminates the interfering S2 data signal. However, it can be seen that a rotation of the receive elements around the transmit axis causes a drop off in signal strength as the receive antenna dipole approaches 45 degrees from the transmit dipole, and then the signal gain starts to rise again requiring some alignment of the receive poles to the S1 and S1$^{-1}$ transmit poles.

Since the signal strength of the first data signal S1 varies as the rotation of the receive antenna changes, various choices are available to maintain the signal strength of the data signal S1. One choice is to provide minor alignment of the receive antenna polarities with the transmit polarities. For example, if the receive antenna can be maintained within a fifteen degree rotation of the transmit antenna, the receive antenna would receive power at about 75% of a fully aligned antenna. Alternatively, in another embodiment, the alignment problem is addressed by having two sets of orthogonal receive antenna each rotated at a 45 degree rotation around the transmit axis from the other, and each capable of receiving both horizontal and vertical polarities. An electronic controller at the receiving end can select the orthogonal dipole pair with the higher S1 data signal strength, thus allowing a complete 360 degree rotation of the antennae around the transmit axis without a complete loss of signal. A rotation along the transmit axis can be compensated for by increasing the signal strength of either the horizontal or vertical received poles to match the other.

Once a dipole pair is selected, the first data signal and the inverse of the first data signal are received at the receiving stations in the two polarities of the selected dipole pair. One of the first data signal and the inverse of the first data signal is inverted and summed with the other of the first data signal and the inverse of the first data signal to yield the first data signal at an increased strength. The received second data signal cancels out at summation.

In a three dimensional receive antenna, multiple sets of dipoles can be located along all three axis. The electronic controller can then select from the best pair of orthogonal dipoles at any particular instant.

Using the above techniques, data carrying capacity can be increased in any transmission medium that allows for transmission of polarized electromagnetic signals. The method and system disclosed herein finds applications, for example, in satellite communications systems, microwave radio systems, and systems using polarized light.

BRIEF DESCRIPTION OF THE DRAWINGS

The foregoing summary, as well as the following detailed description of the invention, is better understood when read in conjunction with the appended drawings. For the purpose of illustrating the invention, exemplary constructions of the invention are shown in the drawings. However, the invention is not limited to the specific methods and components disclosed herein.

DETAILED DESCRIPTION OF THE INVENTION

Figure 1:
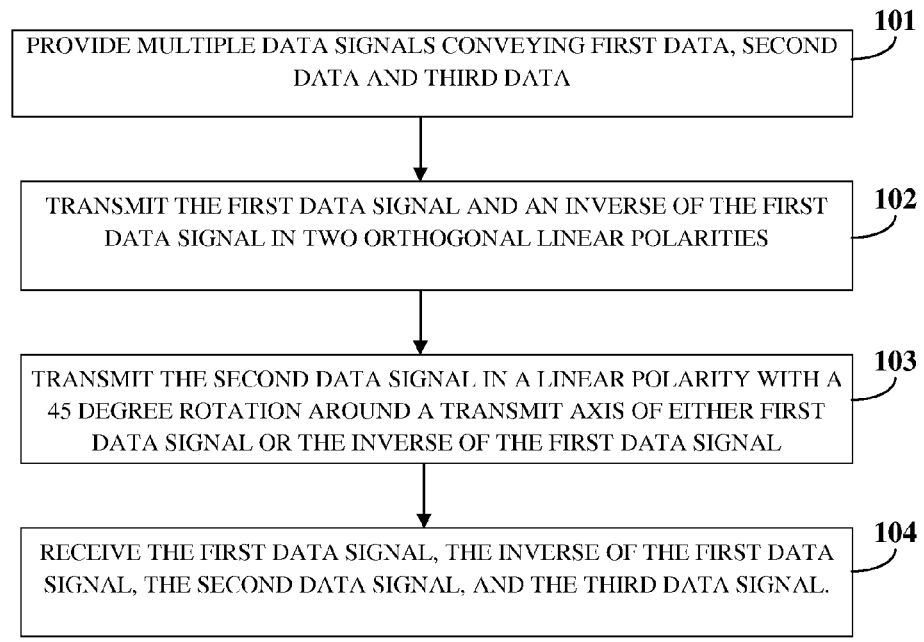
FIG. 1 illustrates a method of transmitting electromagnetic signals over a single frequency using multiple linearly polarized data signals.

FIG. 1 illustrates a method of transmitting electromagnetic signals over a single frequency using multiple linearly polarized data signals. A data source provides 101 multiple data signals conveying first data, second data and third data, wherein the data signals are of the same frequency. The data signals comprise a first data signal conveying first data, a second data signal conveying second data, and a third data signal conveying third data. Each data signal is a stream of data encoded by any of the known means onto a transmit carrier of the selected transmit frequency. One or more transmitting devices transmit 102 the first data signal and an inverse of the first data signal in two orthogonal linear polarities of a linear polarization scheme.

Transmitting devices also transmit 103 the second data signal in a power null of either the first data signal or the inverse of the first data signal. The second data signal is transmitted in a linear polarity with a 45 degree rotation around the transmit axis from either the first data signal or the inverse of the first data signal. The second data signal is transmitted from either a same location as the first data signal or a different location from the first data signal.

In an embodiment, the transmitting devices also transmit 104 the third data signal in the power null of either the first data signal or the inverse of the first data signal. The third data signal is transmitted in linear polarity with a 315 degree or equivalently a −45 degree rotation around the transmit axis of either the first data signal or the inverse of the first data signal. The second data signal and the third data signal are orthogonal to each other at the point of transmission. The third data signal is transmitted from either the same location as the first data signal and/or the second data signal. Alternatively, the third data signal is transmitted from a location different from the first data signal and/or the second data signal.

One or more receiving stations receive 105 the transmitted first data signal, the inverse of the first data signal, the second data signal, and the third data signal.

The method disclosed herein increases data carrying capacity in an electromagnetic transmission system, allowing three distinct data signals to be transmitted simultaneously over the same frequency. The method and system disclosed herein transmits the three data signals using linearly polarized electromagnetic emissions.

The first data signal S1 is divided into two identical copies. One of these copies is inverted, that is, phase changed by 180 degrees. These two inverse first data signals are transmitted in two orthogonal ports of a linear polarity antenna while maintaining their inverse phase relationship. The linearly polarized first data signal is, for example, a horizontally polarized data signal and the inverse of the linearly polarized first data signal is, in this example, a vertically polarized data signal. The phase and amplitude are adjusted if necessary before transmission of the first data signal and the inverse of the first data signal for enabling the first data signal and the inverse of the first data signal to cancel each other out when received together or combined. Complete cancellation of two electromagnetic signals occurs when two identical signals that are 180 degrees out of phase and of equal amplitude are combined or received together. The first data signal and the inverse of the first data signal are transmitted from the same location and exactly 180 degrees out of phase such that these signals can maintain their phase relation as they propagate through space.

Figure 3:
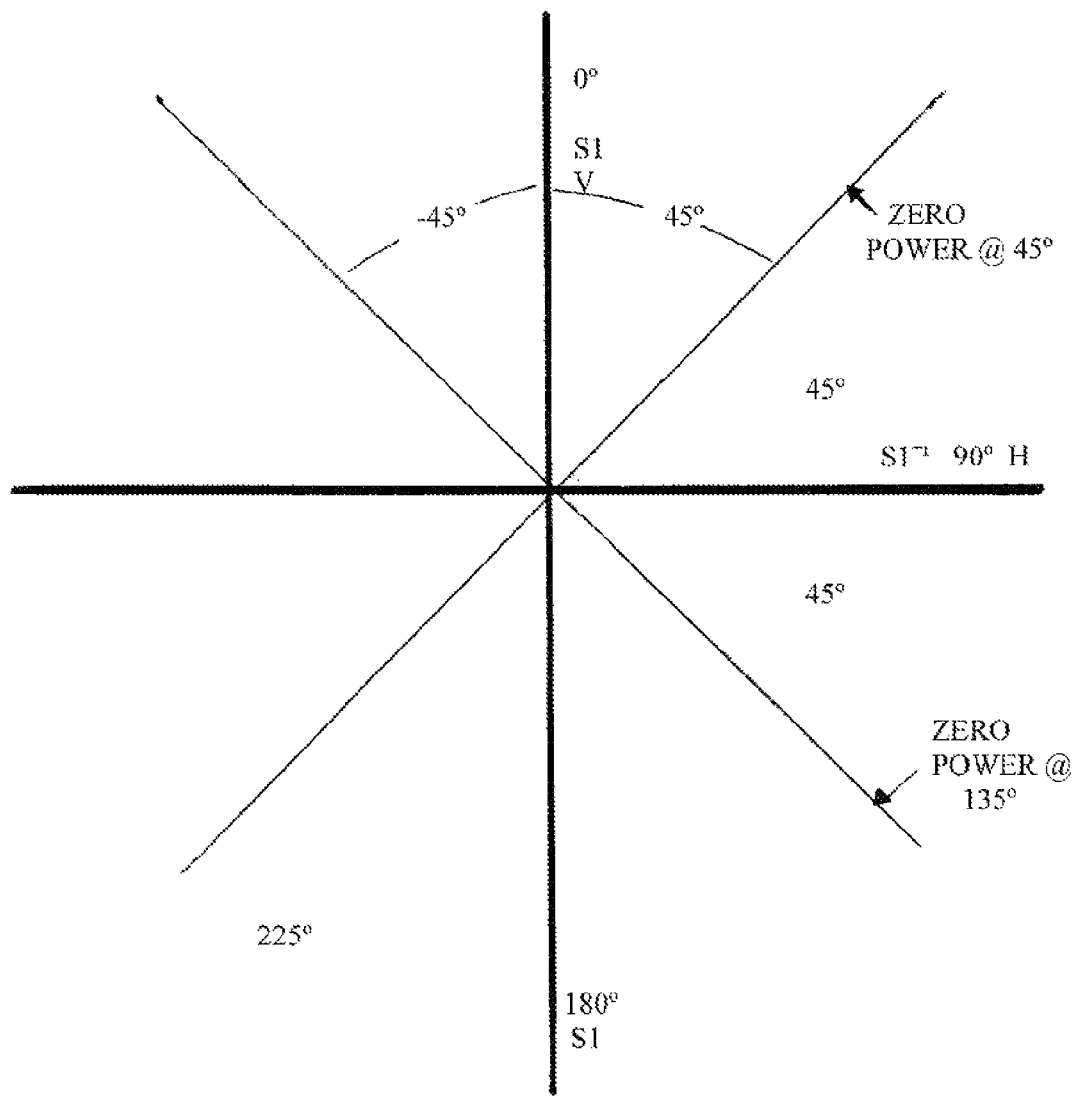
FIG. 3 exemplarily illustrates nulls of the first data signal S1 and the inverse of the first data signal S1$^{-1}$.

Looking down the transmit axis, the nulls of the two inverse signals occur at ±45 degrees from the vertical and identically ±45 degrees from the horizontal as illustrated in FIG. 3. The nulls refer to regions around the transmit axis where there is no measurable power from the first data signals to interfere with other signals. A linear dipole at these rotations will receive zero power from the first data signal S1 and the inverse of the first signal $S1^{-1}$.

In an embodiment, the second data signal S2 and the third data signal S3 are polarized in orthogonal linear polarities, also referred to as horizontal and vertical linear polarities, and transmitted. One of these two data signals, for example, the second data signal S2, is transmitted at 45 degrees around the transmit axis from the first data signal S1, and the third data signal S3 is transmitted at 90 degrees off axis from, or orthogonal to, the vertically polarized second data signal S2. The third data signal is consequently transmitted −45 degrees off axis from the S1 data signal. As a result, the data signals S2 and S3 are transmitted in the power nulls of S1 and $S1^{-1}$ such that the data signals S1 and $S1^{-1}$ do not interfere with the data signals S2 and S3 at reception, and thus reception of the data signals S2 and S3 occurs as it normally would in the absence of S1 and $S1^{-1}$.

Figure 2:
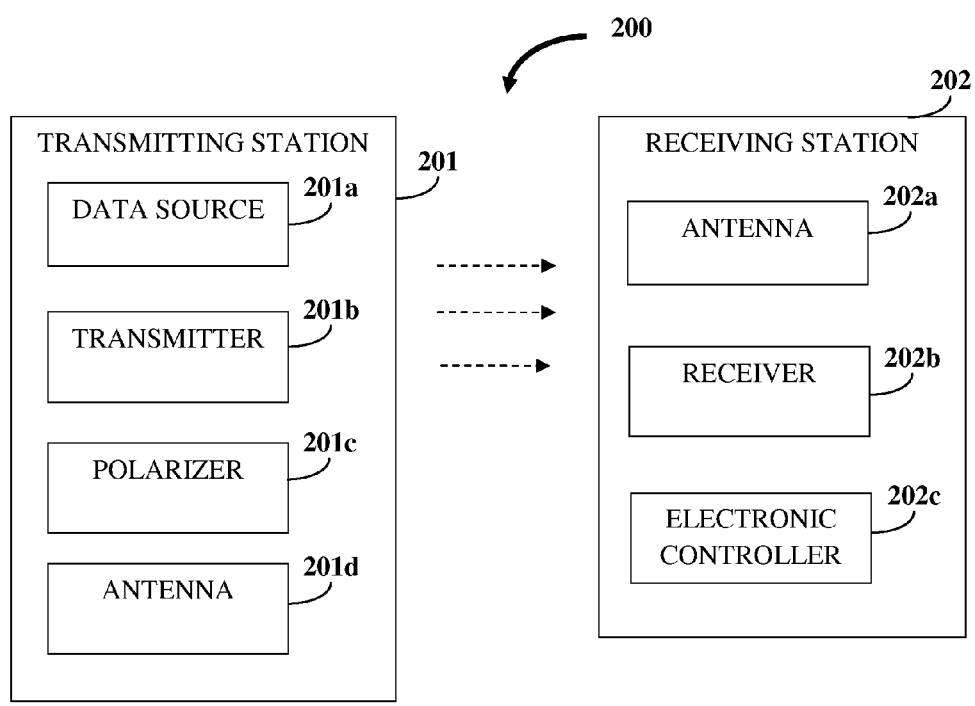
FIG. 2 illustrates a system for transmitting electromagnetic signals over a single frequency using multiple linearly polarized data signals.

FIG. 2 illustrates a system for transmitting electromagnetic signals over a single frequency using multiple linearly polarized data signals. The system 200 comprises a transmitting station 201 and a receiving station 202. The transmitting station 201 comprises a data source 201a, a transmitter 201b, a polarizer 201c, and an antenna 201d. The data source 201a provides multiple data signals conveying first data, second data and third data over a single frequency. The transmitter 201b comprises one or more transmission devices for transmitting each of the data signals. The polarizers 201c polarize each of the data signals in a linear polarization scheme. The antennae 201d at the transmitting stations 201 transmit each of the linearly polarized data signals comprising the first data signal, the inverse of the first signal, the second data signal, and the third data signal to each of one or more receiving stations 202.

The transmitter 201b transmits the first data signal and an inverse of the first data signal in two orthogonal linear polarities of a linear polarization scheme. One of the transmitters 201b transmits the second data signal in a linear polarity with a 45 degree rotation around the transmit axis of either the first data signal or the inverse of the first data signal. The second data signal is transmitted from either a same location as the first data signal or a different location from the first data signal. The receiving stations 202 receive the transmitted first data signal, the inverse of the first data signal, the second data signal and the third data signal. A receiving station 202 comprises an antenna 202a of, for example, linear polarity and a receiver 202b. The receiver 202b receives the transmitted data signals. The antenna 202a of linear polarity receives the linearly polarized data signals.

In an embodiment, one of the transmitters 201b also transmits the third data signal in linear polarity with a 315 degree or equivalently −45 degree rotation around the transmit axis of either the first data signal or the inverse of the first data signal. The second data signal and the third data signal are orthogonal to each other at the point of transmission.

FIG. 3 exemplarily illustrates the transmit nulls of the first data signal S1 and the inverse of the first data signal $S1^{-1}$. These nulls represent the regions around the transmit axis where the transmitted power is zero for the first data signal and the inverse of the first data signal.

Figure 4:
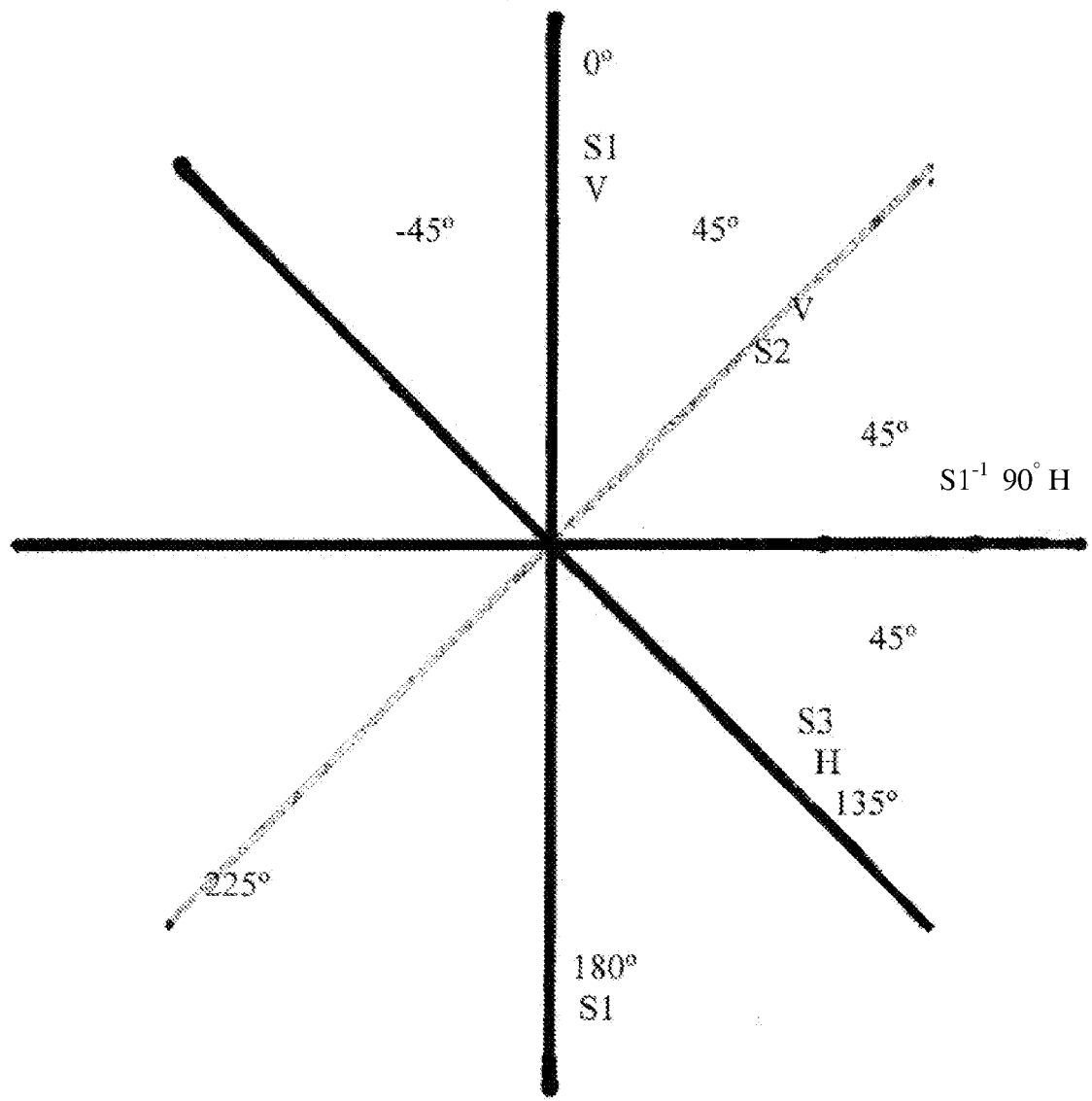
FIG. 4 exemplarily illustrates the relative rotation around the transmit axis of the first data signal S1, the inverse of the first data signal S1$^{-1}$, a second data signal S2, and a third data signal S3.

FIG. 4 exemplarily illustrates the relative rotation around the transmit axis of the first data signal S1, the inverse of the first signal $S1^{-1}$, the second data signal S2, and the third data signal S3. FIG. 4 also shows the polarization around the transmit axis. A receive antenna 202a can be represented by a dipole. Normally, three signals could not be broadcast along the same transmission path due to interference issues. However, by transmitting the two orthogonal S1 and $S1^{-1}$ data signals, S2 and S3 data signals see no interference from S1 and $S1^{-1}$ data signals. Conversely, by using a summation of S1 and $S1^{-1}$ re-inverted signals, interference from S2 and S3 data signals can be eliminated from the first data signal S1.

It is known that the power of an unaligned linear polarized signal received in a linear dipole is represented by $P=A \cos^2 \theta$, where $\theta$ is the angle between the rotation of the transmitted signal and the rotation of the receive dipole, A is the amplitude of the signal received by a correctly aligned dipole, and P is the relative receive power level at the specified angle $\theta$. This is known as the polarization loss factor (PLF). The equation representing the resulting amplitude of the sum of multiple identical sine waves received at different phase angles is given as follows:

$Y = A \sin x + B \sin(x+P2) + C \sin(x+P3) \ldots,$ wherein P2 and P3 represent the phase angles of the second and third waves with respect to the first, and A, B and C represent the amplitudes of the corresponding waves.

Combining the two equations, the power level received by a dipole around the transmit axis at any angle $\theta$ from either of the transmitted inverse orthogonal linear signals is represented as follows:

$$Y = \cos^2 \ominus \sin x + \cos^2(90 - \ominus)\sin(x + 180°)$$
$$= \cos^2 \ominus \sin x - \cos^2(90 - \ominus)\sin x.$$

Solving for Y, it can be seen that nulls, where the amplitude of the inverse orthogonal data signals S1 received by a dipole are zero, occur at 45°, 135°, 225°, 315° around the transmit axis. Since there are no interfering S1 signals at these alignments, these alignments are where the horizontal and vertical data signals S2 and S3 are transmitted. Also, since there are nulls, receiving the horizontal and vertical data signals S2 and S3 only requires the alignment of the receive dipole to the transmit dipole. Having zero power at this rotation, the data signals S1 and its inverse $S1^{-1}$ do not interfere with the data signals S2 and S3.

The two inverted first data signals need to be transmitted from the same transmitting station 201 so as to maintain the inverse phase relationship as these signals propagate through the medium. The data signal S2 can be transmitted from any location as long as the rotational angle of the S2 data signal is plus or minus 45 degrees from that of the S1 and $S1^{-1}$ data signals.

In order to receive the linear second data signal, a receive antenna of linear polarity is aligned to the transmitting station. For example, the received S2 data signal in vertical polarity is aligned with the transmitted S2 data signal in vertical polarity. Since the nulls of first data signal and its inverse align exactly with the transmission rotation of the second data signal, there is no interference from the first data signal and its inverse with the antenna receiving the second data signal. The data signal S3 is orthogonal to the data signal S2, and hence does not interfere with S2 either. The second linear data signal S2 is received as it normally would be without interference from S1, S1$^{-1}$ and S3 data signals. Only a single polarity receive antenna aligned to the transmitted S2 data signal is required.

In order to receive the third data signal, a receive antenna of linear polarity is aligned to the transmitting station. For example, the received S3 data signal in horizontal polarity is aligned to the S3 transmit horizontal polarity. Since the nulls of first data signal and its inverse align exactly with the transmission rotation of the third data signal, there is no interference from the first data signal and its inverse with the antenna receiving the third signal. The data signal S2 is orthogonal to the data signal S3, and hence does not interfere with S3. The third linear data signal S3 is received as it normally would be without interference from S1, S1$^{-1}$, and S2 data signals. Only a single polarity receive antenna aligned to the transmitted S3 data signal is required.

To receive the first data signal, an antenna 202a with both vertical and horizontal receive polarities is used. The receive antenna 202a must be aligned to pick up the selected two inverse S1 signals in the two receive linear ports, for example, the vertical and horizontal ports. One of the set of data signals received in either the horizontal polarity or the vertical polarity is inverted, and one of the set of data signals is phase adjusted if necessary such that the linear S1 signals match in phase. The first polarity signal is summed with the now twice inverted signal set from the second polarity. When the data signals are inverted and summed together, the two S1 data signals match each other, thereby increasing the signal strength of the first data signal. Since the two interfering second and third polarized data signals are received at equal levels in both linear ports, and one of the two received signals is inverted and then summed with the other, the interfering second data signals negate at summation resulting in minimal interference. This can be represented by the following equations:

Received in the horizontal port: $S1 + S2 \cos^2 45° \pm S3 \cos^2 45°$

Received in the vertical port: $S1^{-1} + S2 \cos^2 45° \pm S3 \cos^2 45°$

Invert one and sum (combine) with the other as follows:

$Srx = S1 + S2 \cos^2 45° \pm S3 \cos^2 45° \pm S1 - S2 \cos^2 45° - S3 \cos^2 45° = 2S1$.

In other words, the interfering S2 and S3 data signals cancel upon inversion and summation, and the received signal Srx is S1 with twice the power.

In another embodiment, either the second data signal S2 or the third data signal S3 can be deleted and no signal sent in that polarity. For example, only the vertical polarity data signal S2 can be transmitted along with S1 and S1$^{-1}$ data signals.

In an alternative embodiment, both the vertical S2 data signal and the horizontal S3 data signal are the same signal transmitted in phase, but orthogonal to each other. In this embodiment where the S2 and S3 signals are the same and in phase, the receive antenna polarizations do not need to be aligned to the transmit antenna polarizations. Antennae 102a that can receive both horizontal and vertical polarities are required. The receive antenna 102a can be represented by two orthogonal dipoles. When summed together, it can be seen that the rotation of the receive dipoles around the transmit axis does not matter when receiving the S2 data signal allowing for use in mobile applications.

In another embodiment, in order to receive the S2 data signal without interference, both orthogonal receive elements, for example, horizontal and vertical receive elements receiving signals in equal strength are used. Alternatively, the strength of the two poles is electronically adjusted such that the amplitudes of the two polarities are equal. In order to detect the second data signal S2, the received signal in the horizontal linear receive polarity is summed with the received signal in the orthogonal polarity.

The following equations describe the power levels of the received interfering signals S1 and S1$^{-1}$. In the horizontal (H) and vertical (V) polarities, where θ is the angle between the interfering S1 signal and one receive linear dipole, and 90-θ is the angle between the other transmitted signal S1$^{-1}$ and the same selected linear receive dipole, Hrx is the signal received in the horizontal dipole and Vrx is the signal received in the orthogonal dipole:

$Hrx = S1 \cos^2 θ \sin x + S1 \cos^2(90-θ)\sin(x+180°)$ $Vrx = S1 \cos^2(θ)\sin(x+180°) + S1 \cos^2(90-θ)\sin(x)$ Combining the above two equations together:

$$Srx = Hrx + Vrx$$
$$= S1\cos^2 θ \sin x - S1\cos^2(90-θ)\sin(x) - S1\cos^2(θ)\sin(x) + S1\cos^2(90-θ)\sin(x)$$
$$= 0.$$

Hence the interfering inverse S1 data signals cancel upon summation of the received signals in the receiving station 202, irrespective of the rotation of the receive dipoles in relation to the transmit dipoles. The power equations for the second data signal S2, received in the two polarities H and V are as follows:

$Hrx = S2 \cos^2(θ) + S2 \cos^2(90-θ)$ $Vrx = S2 \cos^2(90-θ) + S2 \cos^2(θ)$

Combining the signals received in the two ports, viz. horizontal and vertical ports:

$H+V = 2 S2 \cos^2(θ) + 2 S2 \cos^2(90-θ) = 2 S2(\cos^2(θ) + \sin^2 θ) = 2 S2$.

Hence, the power level of the desired data signal S2 always sums to two times S2 irrespective of the rotation of the two receive dipoles around the transmit axis in relation to the two transmit dipoles, while the unwanted data signals S1 and S1$^{-1}$ always sum to zero power.

In summary, upon summing the two receive polarities, Hrx and Vrx of the receive antenna 202a, the interfering inverse data signals S1 and S1$^{-1}$ always sum to zero, and the desired second data signal S2 transmitted in horizontal and vertical polarities always sum to two times S2 (full power). The rotation around the transmit axis does not matter. If there is another rotation along the Z axis, for example, away or toward the transmitter, it is possible to adjust the received levels such that the amplitude of each dipole is equal and hence the interfering received signals cancel.

In order to detect the first data signal S1, instead of summing the signals received in the two polarities, one of the two signals is phase changed 180 degrees (inverted) and then summed with the other. Looking at the interfering linear data signals S2 in vertical and horizontal polarizations, it can be seen that inverting one of the two polarized received signals and summing with the other of the two polarized received signals from the two receive polarities cancels out the interfering data signals S2, irrespective of the rotation around the transmit axis of the receive dipoles, leaving S1 alone without interference from S2.

The signals received by Hrx and Vrx poles (unaligned) are represented as follows, where θ and 90-θ are the rotational angles between the transmit dipoles of data signal S2 in H and V polarities, respectively, and the receive dipoles:

$$Hrx=\cos^2\theta \sin x + \cos^2(90-\theta)\sin(x)$$

$$Vrx=\cos^2(90-\theta)\sin(x) + \cos^2\theta \sin x.$$

Inverting one by changing the phase by 180 degrees, the sum of the two signals becomes:

$$\begin{aligned}P &= \cos^2\ominus \sin x + \cos^2(90-\ominus)\sin(x) + \cos^2(90-\ominus)\sin(x+180) + \\ &\quad \cos^2\ominus \sin(x+180)\\ &= \cos^2\ominus \sin x + \cos^2(90-\ominus)\sin(x) - \cos^2(90-\ominus)\sin(x) - \cos^2\ominus \sin(x)\\ &= 0.\end{aligned}$$

Hence the interfering data signals S2 in H and V polarities cancel upon inversion of one and summation to the other.

Options are available to detect the desired data signal S1, where T is the angle between one of the transmit polarities and the receive dipole, and 90°−T is the rotational angle between the other transmit polarity and the same receive dipole. The following equations represent the signals received:

$$Hrx=\cos^2 T \sin x + \cos^2(90°-T)\sin(x+180°)$$

$$Vrx=\cos^2 T \sin(x+180°) + \cos^2(90°-T)\sin x$$

Inverting one of the above equations and summing:

$$\begin{aligned}P &= Hrx + Vrx\\ &= \cos^2 T\sin x + \cos^2(90°-T)\sin(x+180°) + \cos^2 T\sin(x+180°-180°) + \\ &\quad \cos^2(90°-T)\sin(x-180°)\\ &= \cos^2 T\sin x - \cos^2(90°-T)\sin(x) + \cos^2 T\sin(x) - \cos^2(90°-T)\sin(x)\\ &= 2(\cos^2 T\sin x - \sin^2(T)\sin(x)).\end{aligned}$$

It can be seen that a rotation around the transmit axis causes a drop off in signal strength of S1 to zero as the orthogonal receive dipoles approaches a 45 degree rotation from the transmit dipoles, and then the signal strength starts to gain again.

In summary, by receiving both horizontal and vertical polarity signals, and inverting one and summing with the other, the interfering S2 signal cancels out. However, the rotation of the receive antenna 202a around the transmit axis influences the signal strength of the first data signal S1 at a receive dipole. Various approaches can be used to always receive a detectable S1 signal. One choice is to provide few degrees of alignment of the receive poles with the transmit poles such that the rotational angle of the receive polarities is close to the angle of the transmit polarities. For example, if the receive antenna 202a can be maintained within a fifteen degree rotation of the transmit antenna poles, then the receive antenna 202a would receive power at about at least 75% of a fully aligned antenna. Alternatively, the alignment problem can be addressed by having two sets of orthogonal receive antennae 202a each at a 45 degree rotation from the other. The electronic controller 202c can select the antenna 202a with the higher gain, thus allowing a complete 360 degree rotation of the receive antenna 202a around the transmit axis.

Figure 5:
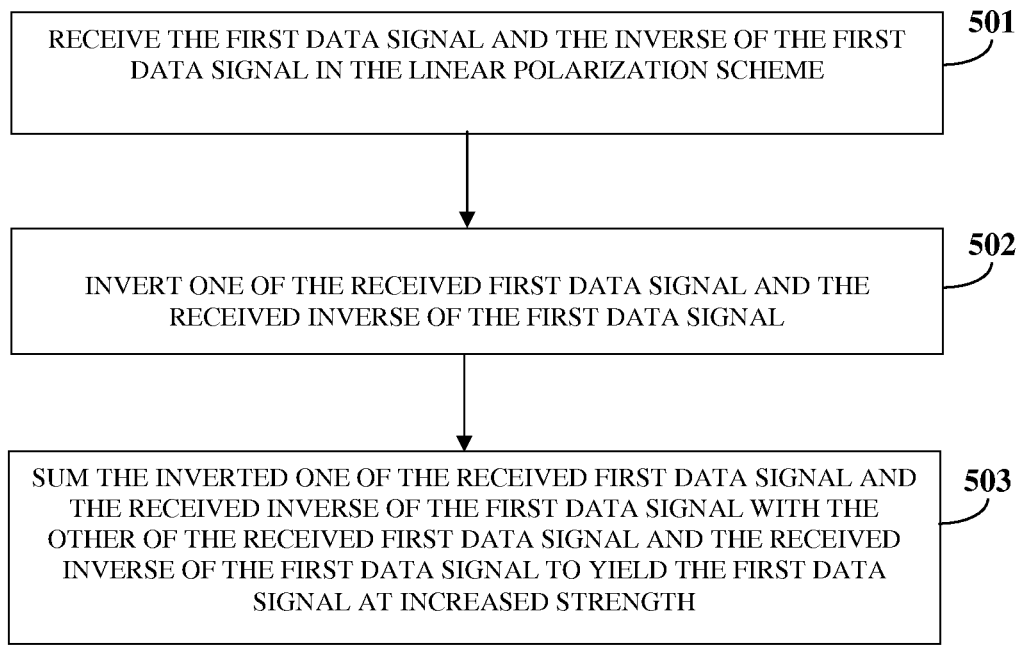
FIG. 5 exemplarily illustrates a flow chart for reception of data signals at a receiving station for acquiring the first data signal.

FIG. 5 exemplarily illustrates a flow chart for reception of data signals at a receiving station 202 for acquiring the first data signal. The first data signal and the inverse of the first data signal are received 501 at the receiving stations 202 in the linear polarization scheme. One of the first data signal and the inverse of the first data signal is inverted 502 and summed 503 with the other of the first data signal and the inverse of the first data signal to yield the first data signal at an increased strength. The received second data signal cancels out at summation. In the case where the second and third data signals are not identical, both the received second data signal and the received third data signal cancel out at summation.

Figure 6:
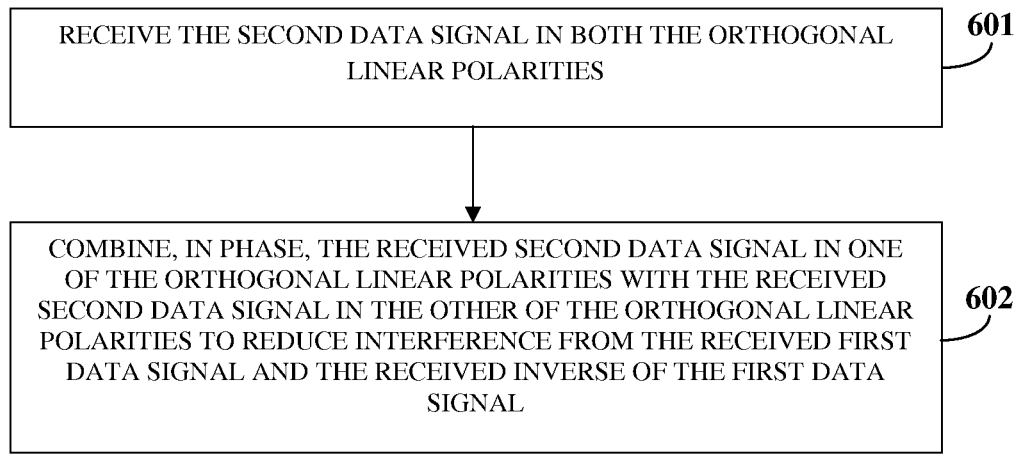
FIG. 6 exemplarily illustrates a flow chart for reception of data signals at a receiving station for acquiring the second data signal when S2 and S3 carry the same data signal.

FIG. 6 exemplarily illustrates a flow chart for reception of data signals at a receiving station 202 for acquiring the second data signal when S2 and S3 are the same and in phase. In this example, the rotation of a receive antenna feed in relationship to a transmit antenna feed is unaligned. The second data signal is received 601 at the receiving stations 202 in both the orthogonal linear polarities. The received second data signal in one of the orthogonal linear polarities is combined 602, in phase, with the received second data signal in the other of the orthogonal linear polarities to reduce interference from the first data signal and the inverse of the first data signal.

In another embodiment, a first set of two orthogonal poles receives the first data signal, the inverse of the first data signal, and the second data signal. A second set of orthogonal poles also receives the first data signal, the inverse of the first data signal, and the second data signal. An electronic controller 202c at one or more receiving stations selects either the first set of two orthogonal poles or the second set of two orthogonal poles for retrieving the first data signal at maximum reception strength of the first data signal. In a three dimensional version, multiple sets of orthogonal dipoles can be located along various axis. The electronic controller 202c can then select from the best pair of orthogonal dipoles at any particular instant.

In another embodiment of the receive antenna, the antenna 202a is designed or configured to emulate or function as a gyroscope. In this configuration, the vertical polarity dipole is used as the center axis of the gyroscope. The horizontal antenna is a disk that rotates around the vertical axis. The rotation of the disk keeps the antenna 202a gyro stabilized such that the axis is always parallel to the vertical axis of the transmit antenna, and preferably perpendicular to the Earth's surface. The horizontal antenna picks up the horizontally polarized signal preferably parallel to the Earth's surface.

Figure 7:
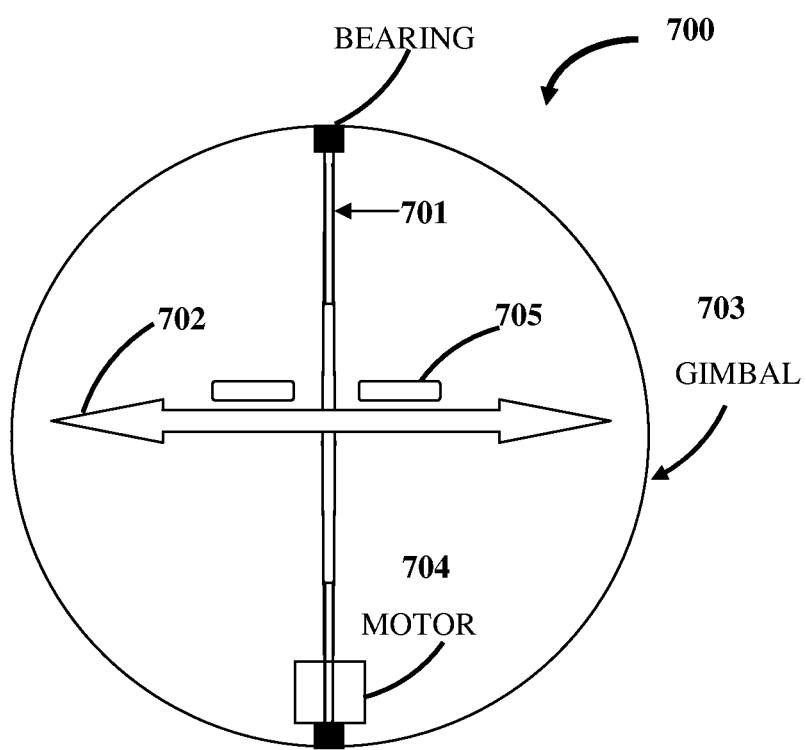
FIG. 7 exemplarily illustrates a configuration for a gyroscopic receive antenna.

FIG. 7 exemplarily illustrates a configuration for a gyroscopic receive antenna. The spindle of the antenna is a rotating shaft 701 that also acts as the vertical receive dipole. The entire assembly 700 is gimbaled 703 to allow the momentum of the device to gyro stabilize itself. The gimbal 703 is manufactured of material transparent to the selected electromagnetic signals. The platform 702 rotates around and with the shaft 701. This platform 702 forms the horizontal receive dipole. The receive electronics 705 can be mounted on the platform 702. The motor 704 turns the shaft 701 and the platform 702 at a high velocity. Also, the motor 704 adds weight to the lower end of the spindle such that when the spindle winds down, the vertical shaft 701 aligns perpendicular to the Earth as a result of gravity. The resulting received signal can be relayed by electromagnetic signals to additional electronics at the receiving station 202.

Figure 8A:
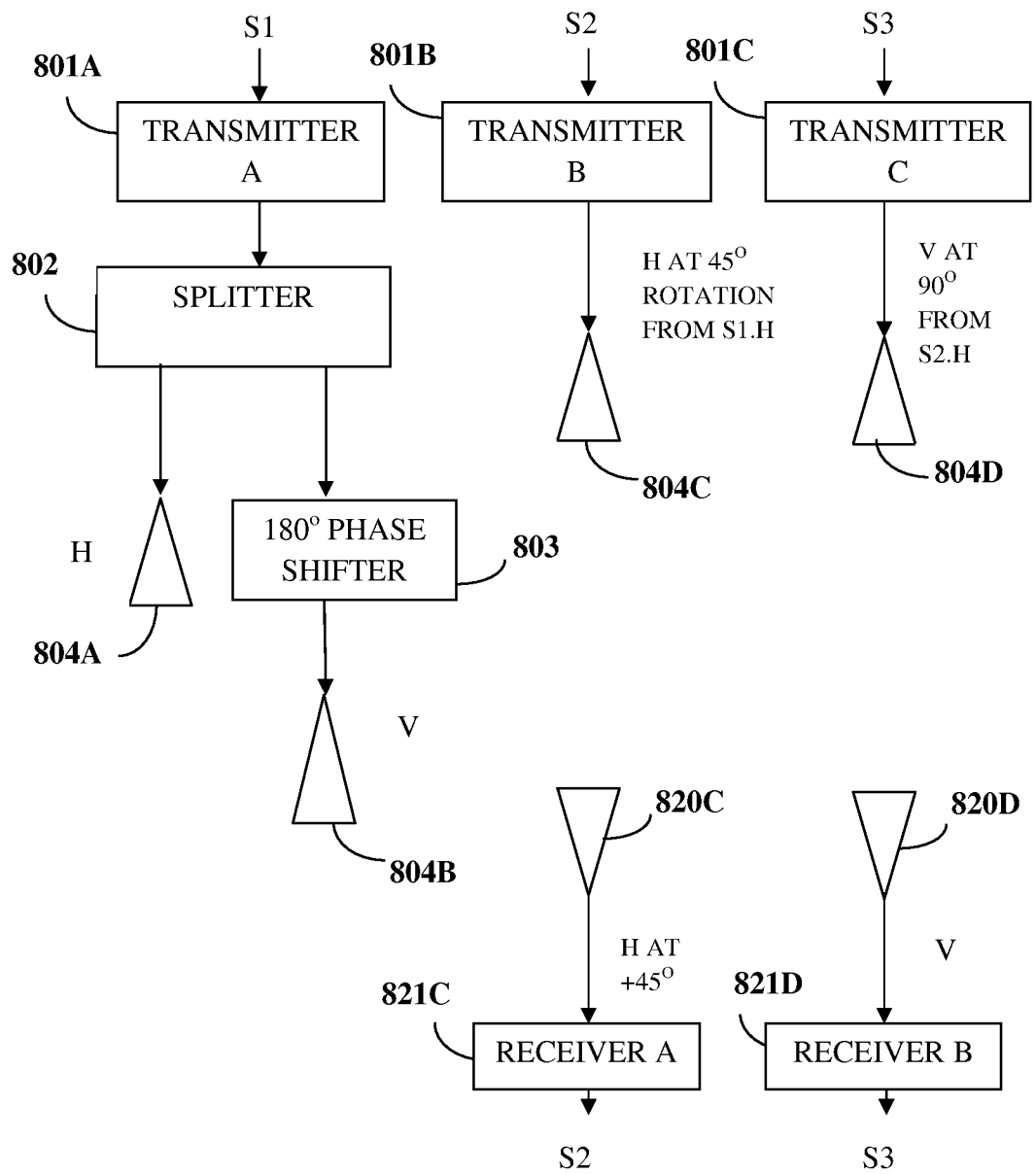
FIGS. 8A-8B exemplarily illustrate a typical implementation of the method to transmit and receive three distinct data signals on the same frequency simultaneously.
Figure 8B:
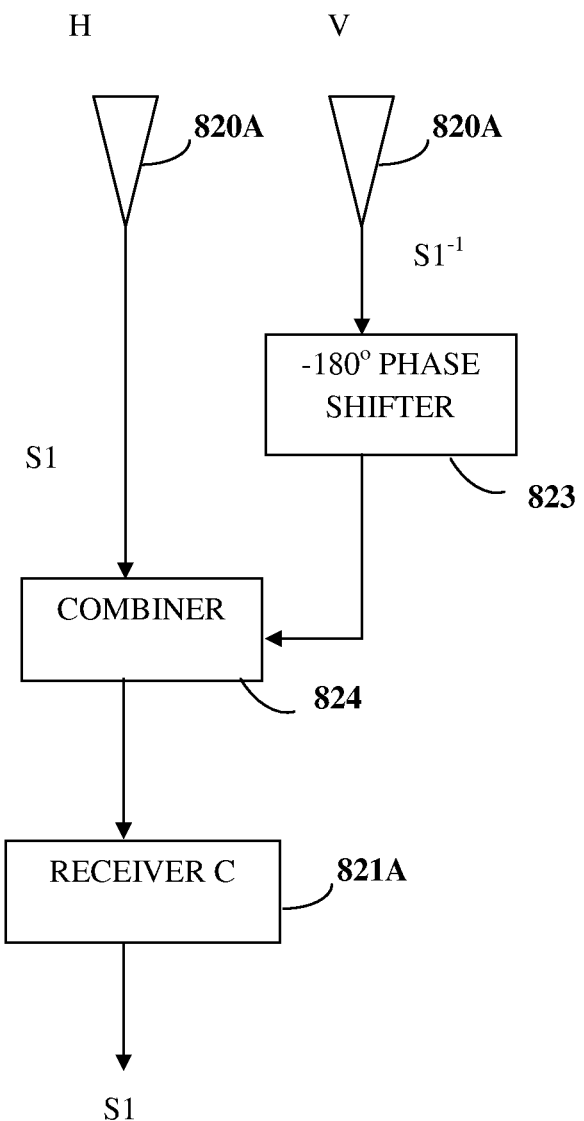

FIGS. 8A and 8B exemplarily illustrate a typical implementation of the method to transmit and receive three distinct data signals on the same frequency simultaneously. The first data signal is encoded and amplified by transmitter A 801A, and split into two signals by a splitter 802. One copy is phase adjusted by 180 degrees forward or backward by a phase inverter 803. The S1 signal is transmitted in the horizontal polarization through the antenna 804A. The $S1^{-1}$ signal is transmitted in the vertical polarization through the antenna 804B.

S2 is transmitted at a 45 degree rotation from S1 by transmitter B 801B through antenna 804C. S3 is transmitted at a 90 degree rotation, that is, orthogonally from S2 by transmitter C 801C through antenna 804D.

S1 horizontal is received in the horizontal polarity of antenna 820A. $S1^{-1}$ is received in the vertical polarity of antenna 820A. $S1^{-1}$ is inverted back to being in phase with S1 by a 180 phase shifter 823. The two received signals are combined in phase at the combiner 824. Additional decoding and detection is performed by receiver C 821A resulting in the output of the first data signal S1.

S2 is received in the horizontal polarity of antenna 820C which is aligned to the transmit polarity of the antenna 804C. The received S2 signal is processed in receiver A 821C resulting in the output of the second data signal S2. S3 is received in the vertical polarity of antenna 820D which is aligned to the transmit polarity of the antenna 804D. The received S3 signal is detected and decoded in receiver B 821D resulting in the output of the third data signal S3.

The foregoing examples have been provided merely for the purpose of explanation and are in no way to be construed as limiting of the present invention disclosed herein. While the invention has been described with reference to various embodiments, it is understood that the words, which have been used herein, are words of description and illustration, rather than words of limitation. Further, although the invention has been described herein with reference to particular means, materials, and embodiments, the invention is not intended to be limited to the particulars disclosed herein; rather, the invention extends to all functionally equivalent structures, methods and uses, such as are within the scope of the appended claims. Those skilled in the art, having the benefit of the teachings of this specification, may affect numerous modifications thereto and changes may be made without departing from the scope and spirit of the invention in its aspects.

I claim:

1. A method for transmitting electromagnetic signals, comprising:
   providing said electromagnetic signals conveying first data and second data, wherein said electromagnetic signals are of a same frequency, and wherein said electromagnetic signals comprise a first data signal conveying said first data and a second data signal conveying said second data;
   transmitting said first data signal and an inverse of said first data signal respectively in two orthogonal linear polarities of a linear polarization scheme so as to maintain their inverted phase relationship once propagated; and
   transmitting in a linear polarity said second data signal in a power null of said transmitted first data signal and said transmitted inverse of said first data signal.

2. The method of claim 1, wherein transmitting said second data signal further comprises:
   transmitting said second data signal in a linear polarity with a 45 degree rotation around a transmit axis of one of said transmitted first data signal and said transmitted inverse of said first data signal, wherein said second data signal is transmitted from one of a same location as said first data signal and a different location from said first data signal.

3. The method of claim 1, further comprising:
   providing a data signal conveying third data, wherein said data signal is of same frequency as said first and second data signals, and wherein said data signal comprises said third data signal conveying third data; and
   transmitting said third data signal in a linear polarity, wherein said third data signal is transmitted orthogonally to said second data signal.

4. The method of claim 1, further comprising:
   receiving said transmitted second data signal at one or more receiving stations, in an antenna aligned with transmitted polarity of said second data signal.

5. The method of claim 1, further comprising:
   receiving said first data signal and said inverse of said first data signal at said one or more receiving stations in said orthogonal linear polarities;
   inverting one of said received first data signal and said received inverse of said first data signal; and
   summing in phase said inverted one of said received first data signal and said received inverse of said first data signal with the other of said received first data signal and said received inverse of said first data signal to yield said first data signal at increased strength, wherein received interfering second data signals cancel at summation.

6. The method of claim 3, wherein said third data signal is identical to said second data signal and propagated in phase with said second data signal.

7. The method of claim 6, further comprising:
   receiving said second data signal and said third data signal by a receive antenna capable of receiving both horizontal and vertical linear polarities, wherein said receive antenna is aligned or unaligned to said polarities of said transmit antenna; and
   combining in phase of said second data signal, said received signals from said horizontal and vertical linear polarities to yield said second data signal at increased strength, wherein received first data signals cancel at summation.

8. The method of claim 6, further comprising:
   receiving said transmitted first data signal, said transmitted inverse of said first data signal, and said transmitted second data signals utilizing a first set of two orthogonal poles;
   receiving said transmitted first data signal, said transmitted inverse of said first data signal, and said transmitted second data signals utilizing a second set of orthogonal poles; and
   for said received signals of each set of said orthogonal poles, inverting one of said received first data signal and said received inverse of said first data signal, and summing said inverted one of said received first data signal and said received inverse of said first data signal with the other of said received first data signal and said received inverse of said first data signal to yield said first data signal at increased strength, wherein received interfering second data signals cancel at summation.

9. The method of claim 8, further including for each of output signal from said summations performing one of:
   a) selecting one of said first set of two orthogonal poles and said second set of two orthogonal poles for retrieving said first data signal at maximum reception strength of said received first data signal; or
   b) summing the summed output results from said first set of orthogonal poles in phase with the summed output results from said second set of orthogonal poles to retrieve said first data signal at increased strength.

10. The method of claim 9, further comprising:
including additional dual polarity receive antennas to receive said transmitted first data signal, said transmitted inverse of said first data signal, and said transmitted second data signals utilizing said orthogonal poles rotated around the transmit axis from said first set of orthogonal poles and from said second set of orthogonal poles;
for the received signals of each set of orthogonal poles, inverting one of said received first data signal and said received inverse of said first data signal;
summing said inverted one of said received first data signal and said received inverse of said first data signal with the other of said received first data signal and said received inverse of said first data signal to yield said first data signal at increased strength, wherein received interfering second data signals cancel at summation;
for each of said output signals from said summations performing one of the following:
a) selecting one of said summations for retrieving said first data signal at maximum strength; or
b) summing the summed output results from said first set of orthogonal poles in phase with summed output results from each additional set of orthogonal poles to retrieve said first data signal at increased strength.

11. The method of claim 6, further comprising providing a spin stabilized receive gyroscopic antenna with a vertical dipole built into the rotating shaft and a horizontal dipole built into the rotating platform at said one or more receiving stations to pick up said transmitted orthogonal linear signals.

12. A method for communicating electromagnetic signals, comprising:
providing said electromagnetic signals conveying first data, second data and third data, wherein said electromagnetic signals are of a same frequency, and wherein said electromagnetic signals comprise a first data signal conveying said first data, a second data signal conveying said second data, and a third data signal conveying said third data;
transmitting said first data signal and an inverse of said first data signal in two orthogonal linear polarities of a linear polarization scheme, said first data signal and said inverse of said first data signal maintaining their 180 degree phase relationship as propagated;
transmitting said second data signal and said third data signal in the power nulls of said first data signal and said inverse of said first data signal, wherein said second data signal and said third data signal are transmitted orthogonally to each other.

13. The method of claim 12, wherein transmitting said second data signal and said third data signal further comprises:
transmitting said second data signal in a linear polarity with a 45 degree rotation around a transmit axis of one of said transmitted first data signal and said transmitted inverse of said first data signal, wherein said second data signal is transmitted from one of a same location as said first data signal and a different location from said first data signal; and
transmitting said third data signal in said linear polarity with a 315 degree rotation around the transmit axis of one of said transmitted first data signal and said transmitted inverse of said first data signal, wherein said third data signal is transmitted orthogonally to said second data signal; and wherein said third data signal is transmitted from one of said same location as said first data signal and said different location from said first data signal.

14. The method of claim 12, further comprising receiving said transmitted signals at one or more receiving stations, wherein said receiving said transmitted signals further comprises:
receiving said transmitted first data signal and said inverse of said first data signal in orthogonal linear polarizations;
inverting one of said received first data signal and said received inverse of said first data signal; and
summing said inverted one of said received first data signal and said received inverse of said first data signal with the other of said received first data signal and said received inverse of said first data signal to yield said first data signal at increased strength, wherein interfering said received second data signals cancel at summation, and wherein interfering said third data signals cancel at summation.

15. The method of claim 14, further comprising:
at said one or more receiving stations, receiving said second data signal at a linear polarity antenna aligned to polarity of an antenna transmitting said second data signal, thereby receiving said second data signal with low interference; and
at said one or more receiving stations, receiving said third data signal at a linear polarity antenna aligned to polarity of an antenna transmitting said third data signal, thereby receiving said third data signal with low interference.

16. A system for transmitting electromagnetic signals, comprising:
a data source for providing a plurality of data signals conveying first data, second data and third data, wherein said data signals are of a same frequency, and wherein said data signals comprise a first data signal conveying said first data, a second data signal conveying said second data, and a third data signal conveying said third data;
one or more transmitting devices for transmitting said first data signal and an inverse of said first data signal in two orthogonal linear polarities respectively of a linear polarization scheme;
said one or more transmitting devices for transmitting said second data signal in a linear polarity with a 45 degree rotation around a transmit axis of one of said transmitted first data signal and said transmitted inverse of said first data signal, wherein said second data signal is transmitted from one of a same location as said first data signal and a different location from said first data signal; and
said one or more transmitting devices for transmitting said third data signal in a linear polarity, said third data signal transmitted orthogonally to said second data signal, wherein said third data signal is transmitted from one of said same location as said first data signal and said different location from said first data signal, and one of said same location as said second data signal and said different location from said second data signal.

17. The system of claim 16, further comprising one or more receiving stations including at least one of:
a first single polarity receive antenna aligned to said polarity of said transmitting device of said second data signal for receiving said second data signal with low interference from said first data signal and said inverse of said first data signal which cancel each other at reception; or
a second single polarity receive antenna aligned to said polarity of said transmitting device of said third data signal for receiving said third data signal with low interference from said first data signal and said inverse of first data signal which cancel each other at reception; or a dual polarity receive antenna aligned to said polarities of said transmitting device of said second and third data signals for receiving said second and third data signals with low interference from said first data signal and said inverse of first data signal which cancel each other at reception; or a dual polarity receive antenna aligned to said polarities of said transmitting device of said first data signal and its inverse, inverting one of said received first data signal and said received inverse of said first data signal, and summing said inverted one of said received first data signal and said received inverse of said first data signal with the other of said received first data signal and said received inverse of said first data signal to yield said first data signal at increased strength, wherein interfering said received second data signals cancel at summation, and wherein interfering said third data signals cancel at summation.

18. A method for communicating electromagnetic signals, comprising:
   providing a plurality of electromagnetic signals conveying first data, second data and third data, wherein said electromagnetic signals are of a same frequency, and wherein said electromagnetic signals comprise a first data signal conveying said first data, a second data signal conveying said second data, and a third data signal conveying said third data, wherein said second and third data signals occupy orthogonal linear polarities;
   generating an inverse copy of said first data signal;
   transmitting, in a linear polarization scheme, said first data signal at a 45 degree rotation around a transmit axis from said second data signal; and
   transmitting said inverse of said first data signal at a 135 degree rotation around the transmit axis from said second data signal;
   said first data signal and said inverse of said first data signal propagated so as to maintain their 180 degree or inverted phase relationship once transmitted; and
   thereby increasing capacity in a electromagnetic transmission system.

19. The method of claim 18, further comprising:
   receiving said first data signal and said inverse of said first data signal, wherein receiving said first data signal and said inverse of said first data signal further comprises:
   inverting one of said received first data signal and said received inverse of said first data signal; and
   summing said inverted one of said received first data signal and said received inverse of said first data signal with the other of said received first data signal and said received inverse of said first data signal to yield said first data signal at increased strength, wherein said interfering received third data signal and second data signal cancel at summation.

20. A method for receiving electromagnetic signals, comprising:
   receiving a transmitted data signal and an inverse of said transmitted data signal in orthogonal polarities;
   inverting one of said received data signal and said received inverse of said data signal; and
   combining in phase said inverted one of said received data signal and said received inverse of said data signal with other of said received data signal and said received inverse of said data signal to yield said received data signal at increased strength, wherein received interfering data signals cancel at summation.

* * * * *